United States Patent [19]

Batten

[11] Patent Number: 5,360,555
[45] Date of Patent: Nov. 1, 1994

[54] SOLIDS HANDLING IN AN OIL/GREASE SEPARATOR

[75] Inventor: William C. Batten, Asheboro, N.C.

[73] Assignee: Clearline Systems, Inc., Asheboro

[21] Appl. No.: 126,374

[22] Filed: Sep. 24, 1993

[51] Int. Cl.⁵ .......................... B01D 21/02; C02F 1/40
[52] U.S. Cl. ..................... 210/803; 210/521; 210/532.1; 210/535; 210/540; 210/307
[58] Field of Search ............... 210/521, 532.1, 534, 210/535, 536, 533, 538, 540, 800, 803, 307

[56] References Cited

U.S. PATENT DOCUMENTS

| | | | |
|---|---|---|---|
| 1,530,077 | 3/1925 | Haynes | 210/533 |
| 2,782,929 | 2/1957 | Colket | 210/540 |
| 2,894,631 | 7/1959 | Levit et al. | 210/167 |
| 3,529,728 | 9/1970 | Middelbeek et al. | 210/540 |
| 3,731,802 | 5/1973 | James | 210/533 |
| 4,051,024 | 9/1977 | Lowe et al. | 210/292.4 |
| 4,235,726 | 11/1980 | Shimko | 210/523 |
| 4,268,396 | 5/1981 | Lowe | 210/532.1 |
| 4,400,274 | 8/1983 | Protor | 210/521 |
| 4,462,915 | 7/1984 | Friedman | 210/167 |
| 4,636,308 | 1/1987 | Summers | 210/523 |
| 4,651,762 | 3/1987 | Bowden | 210/523 |
| 4,848,382 | 7/1989 | Bertsch et al. | 210/532.1 |
| 4,998,548 | 3/1991 | Lagerstrand | 210/167 |
| 5,030,357 | 7/1991 | Lowe | 210/923 |
| 5,127,417 | 7/1992 | Tromblee et al. | 134/111 |

FOREIGN PATENT DOCUMENTS 354349 2/1990 European Pat. Off. .
1710517 2/1992 U.S.S.R. .

*Primary Examiner*—Christopher Upton
*Attorney, Agent, or Firm*—Rhodes, Coats & Bennett

[57] ABSTRACT

An oil/grease separation apparatus includes a chamber for receiving a liquid flow containing water, oil/grease and gross solids. An inlet section is separated from a downstream section by a weir, so that a higher static water level is maintained in the inlet section than the downstream section, to facilitate one-way passage of oil/grease from the inlet section to the downstream section. A grinder/pump has an input port in a lower portion of the inlet section. The inlet section has an inlet port, a strainer separating the inlet port and the top of the weir to inhibit passage by solids to the downstream section, and a bottom which slopes downwardly toward the input port of the grinder/pump. An oil/grease separator located in the downstream section removes oil/grease from water held in the downstream section. The gross solids entering the chamber settle in the inlet section for periodic removal with some water by the grinder/pump, oil/grease and water entering the chamber pass to the downstream section where the oil/grease is removed from the water, and the residual water exits the chamber through the outlet section.

22 Claims, 3 Drawing Sheets

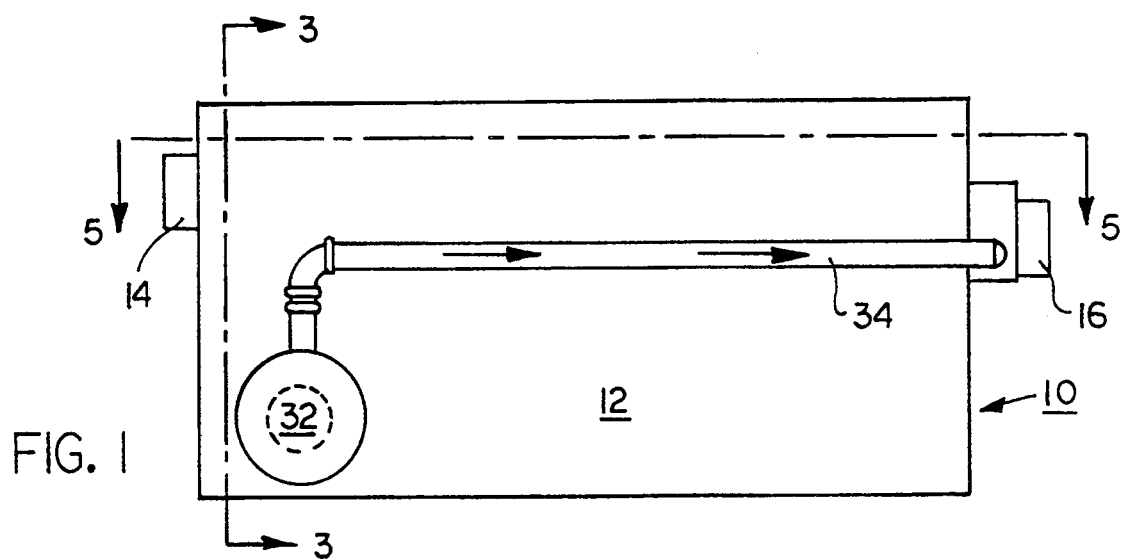

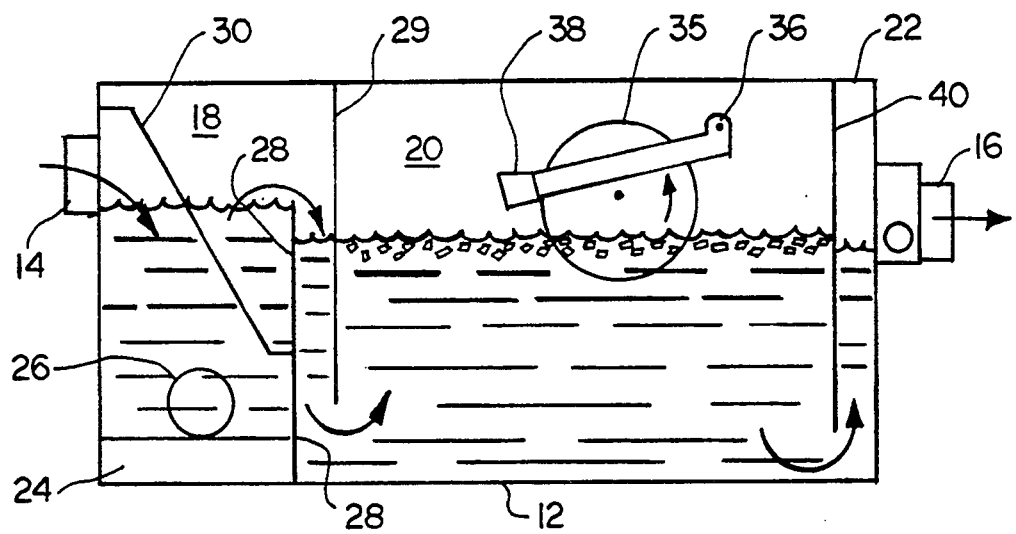
FIG. 4
FIG. 5
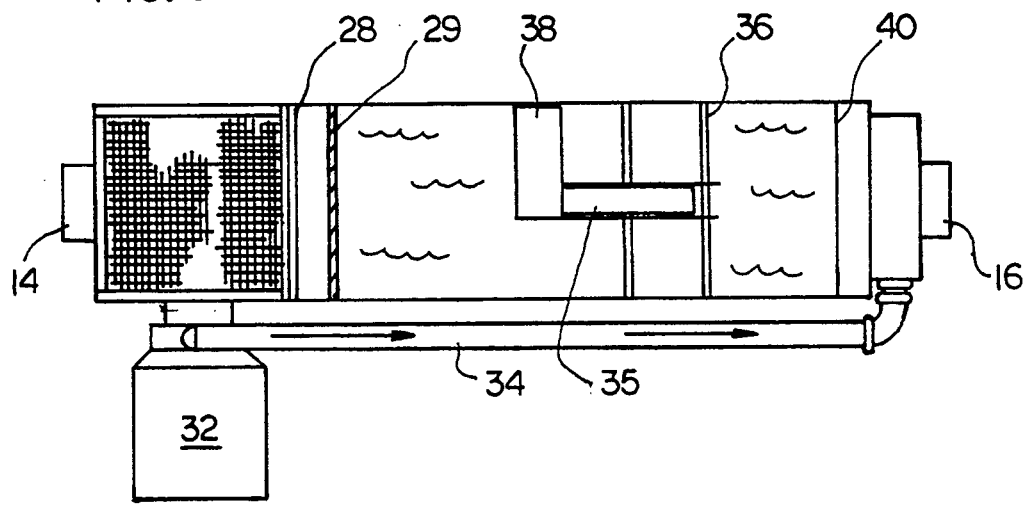
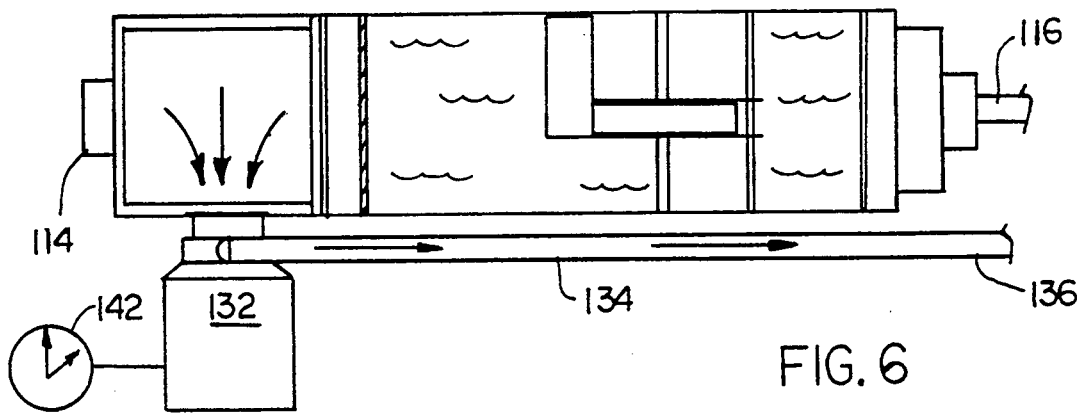
FIG. 6

SOLIDS HANDLING IN AN OIL/GREASE SEPARATOR

BACKGROUND OF THE INVENTION

The present invention relates to improvements in solids handling for effluent streams containing solids. The typical effluent stream for which the present invention is suitable is the discharge from a kitchen, particularly a restaurant kitchen. These discharges can include a number of components including oils and greases, various food waste solids and, of course, water. These discharges from kitchens are not suitable to be sent directly to a sewage treatment plant, largely because of the presence of the oil/grease component. Sewage treatment plants do not handle these components well, and many local codes require their removal. This has traditionally been done in an in-ground grease trap. More recently, oil/grease separators have been available on the market to remove the oil/grease components. For example, the Lowe Engineering Company of Lincoln Park, N.J. makes products of this type, as shown in U.S. Pat. Nos. 4,051,024; 4,268,369 and 5,030,357. In addition, the assignee of the present application, Thermaco, Inc. of Asheboro, N.C. manufactures and sells oil/grease removal apparatus under the trademark BIG DIPPER. Exemplary of the patents owned by Thermaco are U.S. Pat. No. 4,235,726 to Shimko and U.S. Pat. No. 5,133,881 to Miller et al. The disclosure of these two patents is hereby incorporated by reference. What the various patents have in common is the presence of a surface which is hydrophobic and oleophilic, meaning that water does not wet the surface, but oil/grease does. The surface is passed through the upper surface of quiescent oil/grease and water in a holding tank. As the surface emerges, oil sticks to it, but water does not, so the oil can be scraped off and diverted to a separate storage container. The water is permitted to pass down stream through an exit in the lower part of the apparatus.

Typically, these devices have infeed units including a straining basket into which the solids are directed and trapped to remove them from the flow so they do not interfere with the oil/grease removal process. It is up to a restaurant employee to periodically open the unit and remove the strainer and dump its contents. The strainers are objectionable to handle because the solids may have strong odors. Also, the solids will have been immersed in the waste water, which will drip out of the basket. Thus, great care must be exercised to prevent the waste material from getting on the clothing of the person emptying the strainer basket.

Also, since this is an unpleasant chore, sometimes it's not done. If the strainer basket fills and is not emptied, the grease/oil separator unit ceases to be able to receive and transmit flows. The facility in which the device is installed will experience a failure, such as sinks not draining or upstream flows pooling in floor drains.

Finally, in larger units, the strainer baskets are so large that when they are relatively full, the weight of the basket of material to be dumped is great enough so as to injure the worker emptying the strainer.

Accordingly, there is a need in the art for an improvement in devices of this nature to eliminate the problems caused by the presence of strainer baskets.

SUMMARY OF THE INVENTION

The present invention fulfills this need in the art by providing an oil/grease separation apparatus including a chamber for receiving a liquid flow containing water, oil/grease and gross solids. The chamber includes an inlet section, a downstream section and an outlet in an outlet section. A grinder/pump has an input port in a lower portion of the inlet section, and an oil/grease separator is located in the downstream section for removing oil/grease from water held in the downstream section. The gross solids entering the chamber settle in the inlet section for periodic removal with some water by the grinder/pump. Oil/grease and water entering the chamber pass to the downstream section where the oil/grease is removed from the water, and the residual water exits the chamber through the outlet section. The various sections may be housed in separate components with linking fluid flow passages, to permit modular building of the full system.

Preferably, the inlet section is separated from the downstream section by a weir including a first wall extending upwardly from the bottom of the chamber to a top above the outlet and a second wall extending downwardly from a height above the liquid level to a submerged level. This maintains a higher static water level in the inlet section than the downstream section, to facilitate one-way passage of oil/grease from the inlet section to the downstream section and to inhibit such passage by the solids. The inlet section also preferably includes an inlet port and a strainer separating the inlet port and the top of the first wall to prevent passage of solids to the downstream section. Preferably, the grinder/pump is sized large enough so its pumping creates a reverse flow of water through the strainer when the grinder/pump is on in order to backwash the strainer.

Desirably, the inlet section has a bottom which slopes downwardly toward the input port of the grinder/pump.

The apparatus may also include a timer which turns the grinder pump on for a preset period at a preset time. Alternatively, a weight-controlled switch in the inlet section turns the grinder/pump on when a preset weight of solids has been collected in the inlet section and turns the pump off when the solids have been depleted from the inlet section.

In a typical installation, a grease trap is connected to receive the residual water exiting the chamber through the outlet section, but piping from the grinder/pump bypasses the grease trap.

The invention also provides a method including introducing a liquid flow containing water, oil/grease and gross solids into a chamber having an inlet section, a downstream section and an outlet in an outlet section, permitting the gross solids entering the inlet section to settle, periodically removing the solids from the inlet section with some water by a grinder/pump, permitting oil/grease and water to pass from the inlet section to a downstream section, removing oil/grease from the water in the downstream section, and permitting the residual water to exit the chamber through the outlet.

Preferably, the step of permitting oil/grease and Water to pass from the inlet section to the downstream section includes passing the oil/grease and water over a weir that maintains a higher static water level in the inlet section than the downstream section.

The method also preferably includes straining gross solids from the liquid flow by a strainer in the inlet section to prevent passage of solids to the downstream section. Desirably, the periodic removal step creates a reverse flow of water through the strainer in order to backwash the strainer.

The periodic removal of solids may take place for preset periods at a preset times. For example, this may take place for thirty seconds every thirty minutes. Alternatively, the periodic removal of solids takes place when a preset weight of solids has been collected in the inlet section and ends when the solids have been depleted from the inlet section.

In a typical installation, the method may include directing the residual water exiting the chamber through the outlet section to a grease trap and directing the solids and water removed from the inlet section during the periodic removal step to bypass the grease trap.

The invention also provides an oil/grease separation apparatus including a chamber for receiving a liquid flow containing water, oil/grease and gross solids, including an inlet section, a downstream section and an outlet in an outlet section. A fluid flow conduit has an input port in a lower portion of the inlet section and an exit port downstream of the outlet section, and an oil/grease separator is located in the downstream section to remove oil/grease from water held in the downstream section. Thus, the gross solids entering the chamber settle in the inlet section for removal to the exit port with some water through the fluid flow conduit, oil/grease and water entering the chamber pass to the downstream section where the oil/grease is removed from the water, and the residual water exits the chamber through the outlet section. Preferably, the fluid flow conduit acts as a siphon. Alternatively, the fluid flow conduit includes a non-macerating pump.

BRIEF DESCRIPTION OF THE DRAWINGS

The invention will be better understood from a reading of the detailed description of the preferred embodiments along with a review of the drawings in which:

FIG. 1 is a side exterior view of an embodiment of the invention;

FIG. 2 is a top view of the embodiment of FIG. 1;

FIG. 3 is a sectional view of the embodiment of FIG. 1, taken along lines 3—3 and looking in the direction of the arrows;

FIG. 4 is a sectional view of the embodiment of FIG. 2 taken along lines 4—4 of FIG. 2 and looking in the direction of the arrows;

FIG. 5 is a sectional view of the embodiment of FIG. 1 taken along lines 5—5 and looking in the direction of the arrows;

FIG. 6 is a view similar to the view of FIG. 2 of an alternate embodiment; and

DETAILED DESCRIPTION OF THE PREFERRED EMBODIMENTS

Figure 7:
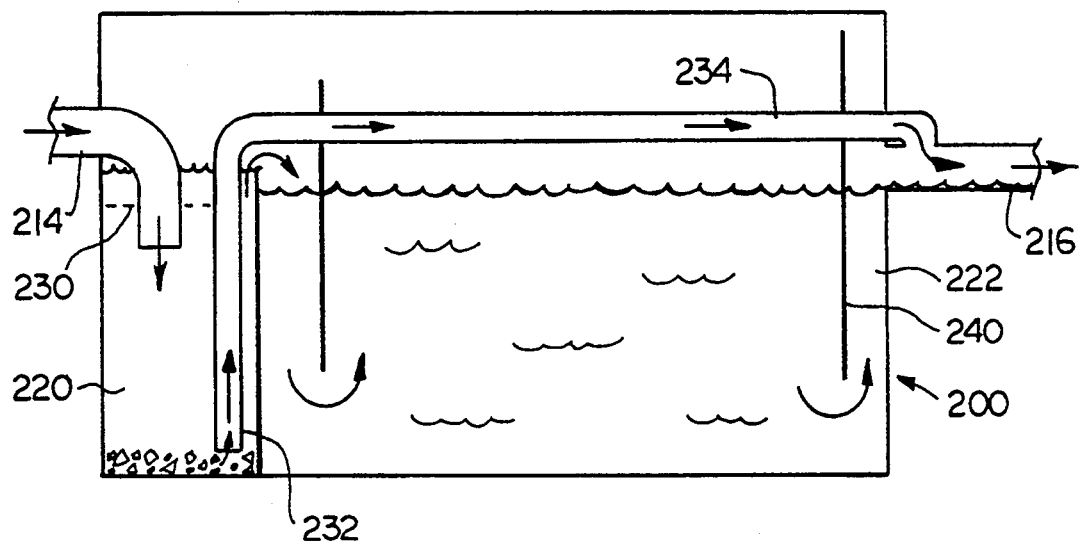
FIG. 7 is a side exterior view of another embodiment of the invention.

The present invention provides an oil/grease separator 10 provided with a solids comminution capability. A housing 12 has a inlet 14 and an outlet 16. As best seen in FIG. 4, the inlet 14, which can be connected to a discharge from a kitchen sink or the like, deposits the kitchen effluent into an inlet chamber 18. The downstream edge of inlet 18 is defined by a weir 28 upstanding from the bottom portion of the chamber 12. A plate 29 extending down from the upper portion of the housing 12 cooperates with the weir 28 to provide a downwardly extending passage into a quiescent region 20. In the quiescent region 20, oil/grease and water reside for a long enough period of time so that the oil/grease floats to the top of the water.

The floating oil/grease can be removed in conventional fashion using any desired oil/grease separator such as those shown in the abovementioned patents. As shown schematically in FIG. 4, a rotating oleophilic disk 35 picks up the oil/grease. The oil/grease is scraped by a trough 36 and is discharged through an exit chute 38. The water, with oil/grease removed, passes under baffle 40 to enter the outlet chamber 22. When it reaches the elevation of the outlet 16, it is discharged from the outlet chamber 22 and the housing 12. From there it can be passed on to a desired downstream device, whether that be a sewer inlet, an in-ground grease trap or the like.

The inlet chamber 18 is provided with a screen 30 attached to the housing 12 above the inlet 14. It slants downwardly in the chamber 18 for connection to a lower portion of the weir 28. As best seen in FIG. 3, the inlet chamber 18 is provided with a sloping bottom 24. At the bottom of the slope 24 is an outlet 26, to which is connected a grinder/pump 32. In the preferred embodiment, the grinder/pump 32 is a garbage disposal as is commonly used in kitchens, although other suitable components could be substituted. The outlet of the grinder/pump 32 is connected via piping 34 to the outlet 16.

A microswitch 42 may be provided below the sloping bottom 24, with a connection to the grinder/pump 32. When the weight of solids deposited on the sloping bottom 24 is sufficient, microswitch 42 will close, thus turning on the grinder/pump 32. When grinder/pump 32 is turned on, solids deposited in the grinder/pump and solids in the inlet chamber 18 are ground and comminuted, and discharged along with water from the inlet section 18 along pipe 34 to the outlet 16.

As the liquid is introduced into chamber 18 through the inlet 14, oil/grease and water pass through the strainer or screen 30 and overflow the weir 28 to a level lower than the inlet 14. Solids do not pass over the weir 28 because they are diverted downwardly by the strainer 30. When the grinder/pump 32 is activated, the flow of water in chamber 18 reverses from the normal flow to backwash the strainer 30 and remove any solids which may have become lodged in the strainer. However, very little oil/grease passes out through the grinder/pump 32 because having passed over weir 28, it does not make a return journey even under the suction of the grinder/pump. As can be seen in FIG. 4, the weir 28 is designed to extend above the lower portion of the outlet 16. The lower portion of the outlet 16 defines the static water level in the outlet chamber 22. This in turn defines a different surface level in the chamber 20, differing because of the different specific gravity of the oil/grease so as to cause an upper oil/grease surface above the bottom of the outlet 16. This level will also be held in the passage between the weir 28 and baffle 29. However, the weir 28 is provided to be of a height greater than that level, and in common with the bottom of the inlet 14 to assure that when the water is drained from the chamber 18 by the grinder/pump, no reverse flow of oil/grease takes place.

In operation, the oil/grease and solids and water pass into the inlet chamber 18 from inlet 14. The oil/grease and water pass over the weir 28. The solids settle on the sloping bottom 24, which, under the influence of gravity directs them to the inlet 26 to the grinder/pump 32.

As the water and oil/grease pass over the weir 28 to the quiescent separation chamber 20, the oil/grease is removed by the rotation of the oleophilic disk 34 and the scraping action of the trough 36. The water, thus clarified, exits through the chamber 22 to the outlet 16.

When a sufficient quantity of solids has collected on the sloping bottom 24 to activate the microswitch 42, grinder/pump 32 is activated, thus comminuting the solids and charging them along with the water from the inlet chamber 18 along the pipe 34 to the outlet 16. When the amount of solids is depleted, the microswitch opens, turning off the grinder/pump 32. A sufficient quantity of water passes with the solids to maintain fluidity through the pipe 34 and outlet 16. As further liquid enters the apparatus 10 through the inlet 14, the liquid and solids build up again in chamber 18, with the oil/grease passing over the weir 28 for removal.

FIG. 6 shows some alternative design possibilities for use with the apparatus. In this regard, comparable elements are provided as before, with the reference numerals augmented by 100. Thus, the grinder/pump 132 outlets through a pipe 134 which does not connect to the outlet 116, but rather passes thorough independent piping 136 to a sanitary sewer. The piping 116 may be directed to a conventional grease trap. In fact, this trap is required for some code jurisdictions which require new oil/grease components to be directed to the grease trap, but do not require that for the solids. This design is also useful if it is desired to omit the oil/grease separator components 34, 36 and 38 and rely on the separation capabilities of the grease trap itself.

Also shown in FIG. 6 is an alternate, and preferred, way to activate the grinder/pump 132, namely a timer 142, replacing the microswitch 42. Thus, the timer 142 periodically activates the grinder pump 132 to discharge whatever solids may be collected and continue to run for a preset period of time. In a preferred embodiment, the pump is turned on for thirty seconds every thirty minutes.

In addition to the microswitch and timer embodiments, other control mechanisms for the grinder/pump 132 may be substituted, as will be apparent to those of ordinary skill in the art.

Referring to FIG. 7, in another embodiment, a housing 200 has an inlet 214 and an outlet 216. ! n the quiescent region 220, oil/grease and water reside for a long enough period of time so that the oil/grease floats to the top of the water.

The floating oil/grease can be removed in conventional fashion using any desired oil/grease separator (not shown in FIG. 7) such as those discussed above. The water, with oil/grease removed, passes under baffle 240 to enter the outlet chamber 222. When it reaches the elevation of the outlet 216, it is discharged from the outlet chamber 222 and the housing 200.

As before the inlet chamber 220 is provided with a screen 230 attached to the housing above the discharge of the inlet 214. At the bottom of the chamber 220 is located an inlet to a fluid flow conduit 232. The conduit 232 extends to the outlet 21 6. The conduit acts as a siphon to lift and transport solids and some water from the inlet chamber 220 to the outlet 216.

As the fluid is introduced into chamber 220 through the inlet 214, oil/grease and water pass through the strainer or screen 230 and overflow the weir to a level lower than the inlet 214. Solids do not pass over the weir because they are diverted downwardly by the strainer 230. When the liquid level drops in the inlet chamber 220, the siphon becomes active to pull the solids out of the inlet chamber. The lower portion of the outlet 216 defines the static water level in the outlet chamber 222.

Those of ordinary skill in the art will appreciate that the invention could be carried out in other various forms, all of which are deemed to be within the scope of the appended claims.

What is claimed is:

1. An oil/grease separation apparatus comprising
   a chamber for receiving a liquid flow containing water, oil/grease and gross solids, said chamber including an inlet section, a downstream section and an outlet in an outlet section,
   a grinder/pump having an input port in a lower portion of said inlet section, and
   an oil/grease separator located in said downstream section for removing oil/grease from water held in said downstream section,
   whereby the gross solids entering the chamber settle in said inlet section for periodic removal with some water by said grinder/pump, oil/grease and water entering the chamber pass to said downstream section where the oil/grease is removed from the water, and the residual water exits the chamber through the outlet section.

2. An oil/grease separation apparatus as claimed in claim 1 wherein said inlet section is separated from said downstream section by a weir including a first wall extending upwardly from the bottom of said chamber to a top above the outlet and a second wall extending downwardly from a height above the liquid level to a submerged level, whereby a higher static water level is maintained in said inlet section than said downstream section, to facilitate one-way passage of oil/grease from said inlet section to said downstream section and to inhibit such passage by the solids.

3. An oil/grease separation apparatus as claimed in claim 2 wherein said inlet section includes an inlet port and a strainer separating said inlet port and the top of said first wall to prevent passage of solids to said downstream section.

4. An oil/grease separation apparatus as claimed in claim 1 wherein said inlet section includes an inlet port and a strainer separating said inlet port from said downstream portion, to prevent passage of solids to said downstream section.

5. An oil/grease separation apparatus as claimed in claim 1 wherein said inlet section has a bottom which slopes downwardly toward said input port of said grinder/pump.

6. An oil/grease separation apparatus as claimed in claim 1 further comprising a timer which turns the grinder pump on for a preset period at a preset time.

7. An oil/grease separation apparatus as claimed in claim 1 further comprising a weight-controlled switch in the inlet section, which turns the grinder/pump on when a preset weight of solids has been collected in the inlet section and turns the pump off when the solids have been depleted from the inlet section.

8. An oil/grease separation apparatus as claimed in claim 1 wherein said inlet section includes an inlet port and a strainer separating said inlet port from said downstream portion to prevent passage of solids to said downstream section and said grinder/pump is sized to create a reverse flow of water through said strainer when said grinder/pump is on in order to backwash said strainer.

9. An oil/grease separation apparatus as claimed in claim 1 further comprising a grease trap connected to receive the residual water exiting the chamber through the outlet section and piping from the grinder/pump which bypasses the grease trap.

10. An oil/grease separation apparatus comprising a chamber for receiving a liquid flow containing water, oil/grease and gross solids, said chamber including an inlet section, a downstream section and an outlet in an outlet section, said inlet section being separated from said downstream section by a weir including a first wall extending upwardly from the bottom of said chamber to a top above the outlet and a second wall extending downwardly from a height above the liquid level to a submerged level, whereby a higher static water level is maintained in said inlet section than said downstream section, to facilitate one-way passage of oil/grease from said inlet section to said downstream section, a grinder/pump having an input port in a lower portion of said inlet section, said inlet section including an inlet port, a strainer separating said inlet port and the top of said first wall to inhibit passage by solids to the downstream section, and a bottom which slopes downwardly toward said input port of said grinder/pump, and an oil/grease separator located in said downstream section for removing oil/grease from water held in said downstream section, whereby the gross solids entering the chamber settle in said inlet section for periodic removal with some water by said grinder/pump, oil/grease and water entering the chamber pass to said downstream section where the oil/grease is removed from the water, and the residual water exits the chamber through the outlet section.

11. An oil/grease separation method comprising introducing a liquid flow containing water, oil/grease and gross solids into a chamber having an inlet section, a downstream section and an outlet in an outlet section, permitting the gross solids entering the inlet section to settle, periodically removing the solids from the inlet section with some water by a grinder/pump, permitting oil/grease and water to pass from the inlet section to a downstream section, removing oil/grease from the water in the downstream section, and permitting the residual water to exit the chamber through the outlet.

12. An oil/grease separation method as claimed in claim 11 wherein said step of permitting oil/grease and water to pass from the inlet section to the downstream section includes passing the oil/grease and water over a weir that maintains a higher static water level in the inlet section than the downstream section.

13. An oil/grease separation method as claimed in claim 12 further comprising straining gross solids from the liquid flow in the inlet section to prevent passage of solids to the downstream section.

14. An oil/grease separation method as claimed in claim 11 further comprising straining gross solids from the liquid flow in the inlet section to prevent passage of solids to the downstream section.

15. An oil/grease separation method as claimed in claim 11 wherein said periodic removal of solids takes place for preset periods at a preset times.

16. An oil/grease separation method as claimed in claim 11 wherein said periodic removal of solids takes place when a preset weight of solids has been collected in the inlet section and ends when the solids have been depleted from the inlet section.

17. An oil/grease separation method as claimed in claim 11 wherein the inlet section includes an inlet port and a strainer separating the inlet port from the downstream portion to prevent passage of solids to the downstream section and in which said periodic removal step creates a reverse flow of water through the strainer in order to backwash the strainer.

18. An oil/grease separation method as claimed in claim 11 further comprising directing the residual water exiting the chamber through the outlet section to a grease trap and directing the solids and water removed from the inlet section during the periodic removal step to bypass the grease trap.

19. An oil/grease separation method comprising introducing a liquid flow containing water, oil/grease and gross solids into a chamber having an inlet section, a downstream section and an outlet in an outlet section, straining gross solids from the liquid flow in the inlet section to prevent passage of solids to the downstream section, permitting the gross solids entering the inlet section to settle, periodically removing the solids from the inlet section with some water by a grinder/pump that also creates a reverse flow of water through the strainer in order to backwash the strainer, permitting oil/grease and water to pass from the inlet section to a downstream section over a weir that maintains a higher static water level in the inlet section than the downstream section, removing oil/grease from the water in the downstream section, and directing the residual water exiting the chamber through the outlet section to a grease trap and directing the solids and water removed from the inlet section during the periodic removal step to bypass the grease trap.

20. An oil/grease separation apparatus comprising a chamber for receiving a liquid flow containing water, oil/grease and gross solids, said chamber including an inlet section, a downstream section and an outlet in an outlet section, a fluid flow conduit having an input port in a lower portion of said inlet section and an exit port connected to said outlet downstream of said outlet section, and an oil/grease separator located in said downstream section for removing oil/grease from water held in said downstream section, whereby the gross solids entering the chamber settle in said inlet section for removal to said exit port with some water through said fluid flow conduit, oil/grease and water entering the chamber pass to said downstream section where the oil/grease is removed from the water, and the residual water exits the chamber through the outlet section.

21. An apparatus as claimed in claim 20 wherein said fluid flow conduit comprises siphon means.

22. An apparatus as claimed in claim 20 wherein said fluid flow conduit includes a non-macerating pump.

* * * * *